(12) United States Patent
Tewfik et al.

(10) Patent No.: US 8,306,811 B2
(45) Date of Patent: Nov. 6, 2012

(54) EMBEDDING DATA IN AUDIO AND DETECTING EMBEDDED DATA IN AUDIO

(75) Inventors: Ahmed Tewfik, Edina, MN (US); Bin Zhu, Beijing (CN); Mitch Swanson, Eden Prairie, MN (US)

(73) Assignee: Digimarc Corporation, Beaverton, OR (US)

( * ) Notice: Subject to any disclaimer, the term of this patent is extended or adjusted under 35 U.S.C. 154(b) by 1002 days.

(21) Appl. No.: 11/923,355

(22) Filed: Oct. 24, 2007

(65) Prior Publication Data

US 2008/0215333 A1 Sep. 4, 2008

Related U.S. Application Data

(63) Continuation-in-part of application No. 10/360,794, filed on Apr. 30, 2001, now Pat. No. 7,366,908, which is a continuation-in-part of application No. 08/921,931, filed on Aug. 27, 1997, now Pat. No. 6,226,387, and a continuation-in-part of application No. 08/918,126, filed on Aug. 27, 1997, now Pat. No. 6,272,634, and a continuation-in-part of application No. 08/918,125, filed on Aug. 27, 1997, now Pat. No. 6,282,299.

(60) Provisional application No. 60/024,979, filed on Aug. 30, 1996, provisional application No. 60/050,587, filed on Jun. 24, 1997.

(51) Int. Cl.
*G10L 19/00* (2006.01)

(52) U.S. Cl. ...................... 704/200.1; 704/203; 704/205; 704/227; 704/273; 380/201; 380/238; 380/28; 369/47.1; 375/145; 375/240.25; 455/101; 713/176; 725/22; 382/100

(58) Field of Classification Search .................. 375/145, 375/240.25; 725/22; 716/176; 704/227, 704/200.1, 203, 205, 273; 369/47.1; 380/201, 380/238, 28; 382/100; 455/101; 713/176
See application file for complete search history.

(56) References Cited

U.S. PATENT DOCUMENTS

| | | | | |
|---|---|---|---|---|
| 4,230,990 A | * | 10/1980 | Lert et al. ........................ | 725/22 |
| 4,237,484 A | | 12/1980 | Brown | |
| 4,739,398 A | * | 4/1988 | Thomas et al. ................. | 725/22 |
| 4,896,362 A | * | 1/1990 | Veldhuis et al. ............ | 704/200.1 |
| 5,301,363 A | * | 4/1994 | Hinderks ....................... | 455/101 |
| 5,404,377 A | * | 4/1995 | Moses ........................... | 375/145 |

(Continued)

OTHER PUBLICATIONS

Komatsu, "Authentication System Using Concealed Image in Telematics," Memoirs of the School of Science and Engineering, Waseda Univ., No. 52, pp. 45-60.

(Continued)

*Primary Examiner* — Michael Colucci
(74) *Attorney, Agent, or Firm* — Digimarc Corporation

(57) ABSTRACT

A method of embedding data into an audio signal provides a data sequence for embedding in the audio signal and computes masking thresholds for the audio signal from a frequency domain transform of the audio signal. The masking thresholds correspond to subbands of the audio signal, which are obtained from a masking model used to compress the audio signal. The method applies the masking threshold to the data sequence to produce masked data sequence and inserts the masked data sequence in the audio signal to produce an embedded audio signal. A method of detecting data embedded in an audio signal analyzes the audio signal to estimate the masking threshold used in embedding the data and applies the estimated masking threshold to the audio signal to extract the embedded data.

10 Claims, 5 Drawing Sheets

U.S. PATENT DOCUMENTS

| | | | |
|---|---|---|---|
| 5,408,580 A * | 4/1995 | Stautner et al. | 704/205 |
| 5,504,518 A * | 4/1996 | Ellis et al. | 725/22 |
| 5,535,300 A * | 7/1996 | Hall et al. | 704/227 |
| 5,592,584 A * | 1/1997 | Ferreira et al. | 704/203 |
| 5,613,004 A * | 3/1997 | Cooperman et al. | 380/28 |
| 5,633,980 A * | 5/1997 | Ozawa | 704/200.1 |
| 5,687,191 A | 11/1997 | Lee et al. | |
| 5,727,092 A | 3/1998 | Sandford, II | |
| 5,799,270 A * | 8/1998 | Hasegawa | 704/205 |
| 5,809,139 A | 9/1998 | Girod | |
| 5,826,227 A | 10/1998 | Jayant | |
| 5,877,812 A * | 3/1999 | Krause et al. | 375/240.25 |
| 5,889,868 A * | 3/1999 | Moskowitz et al. | 713/176 |
| 5,901,178 A | 5/1999 | Lee | |
| 5,956,674 A * | 9/1999 | Smyth et al. | 704/200.1 |
| 6,404,898 B1 | 6/2002 | Rhoads | |
| 6,792,129 B1 * | 9/2004 | Zeng et al. | 382/100 |
| 2003/0063747 A1 * | 4/2003 | Petrovic | 380/238 |
| 2004/0024588 A1 * | 2/2004 | Watson et al. | 704/200.1 |
| 2004/0059918 A1 * | 3/2004 | Xu | 713/176 |
| 2004/0184369 A1 * | 9/2004 | Herre et al. | 369/47.1 |
| 2005/0105726 A1 * | 5/2005 | Neubauer et al. | 380/201 |
| 2008/0027729 A1 * | 1/2008 | Herre et al. | 704/273 |

OTHER PUBLICATIONS

Nakamura, "A unified Coding Method of Image and Text data using Discrete Orthogonal Transform," Electronics and Communications in Japan, Part 1, vol. 72, No. 4. pp. 50-56.

Komatsu, "A Proposal on Digital Watermark in Document Image Communication and Its Application to Realizing a Signature," Electronics and Communications in Japan, Part 1, vol. 73, No. 5, pp. 22-33.

Tanaka, "A Visual Retrieval System With Private Information for Image Database," Proceeding Int. Conf. on DSP Applications and Technology, 415-421.

Tanaka, "New Integrated Coding Schemes for Computer-Aided Facsimile," Proc. IEEE Int'l Conf. on Sys. Integration, pp. 275-281.

* cited by examiner

EMBEDDING DATA IN AUDIO AND DETECTING EMBEDDED DATA IN AUDIO

RELATED APPLICATION DATA

This application is a continuation in part of U.S. patent application Ser. No. 10/360,794, filed Apr. 30, 2001, which is a continuation-in-part of application Ser. No. 08/921,931, filed Aug. 27, 1997 (now U.S. Pat. No. 6,226,387), which claims priority to provisional applications 60/050,587, filed Jun. 24, 1997, and 60/024,979, filed Aug. 30, 1996.

U.S. patent application Ser. No. 10/360,794 is also a continuation-in-part of application Ser. No. 08/918,126, filed Aug. 27, 1997 (now U.S. Pat. No. 6,272,634), which claims priority to provisional applications 60/050,587, filed Jun. 24, 1997, and 60/024,979, filed Aug. 30, 1996.

U.S. patent application Ser. No. 10/360,794 is also a continuation-in-part of application Ser. No. 08/918,125, filed Aug. 27, 1997 (now U.S. Pat. No. 6,282,299), which claims priority to provisional applications 60/050,587, filed Jun. 24, 1997, and 60/024,979, filed Aug. 30, 1996.

The above applications and patents are incorporated by reference.

GOVERNMENT RIGHTS STATEMENT

The inventions detailed in this application was made with government support by AFOSR under grant AF/F49620-94-1-0461, NSF under grant NSF/INT-9406954 and ARPA GRANT No. AF/F49620-93-1-0558. The Government has certain rights in this invention.

FIELD OF THE INVENTION

This invention relates generally to techniques for embedding data such as watermarks, signatures and captions in digital data, and more particularly to embedding such data in human perceptible sounds.

BACKGROUND OF THE INVENTION

Advances in information systems and networked databases continue to spur rapid growth in digital media, e.g., audio, image and video. This is due, in part, to highly efficient manipulation, reproduction, and access afforded by digital media. Data hiding is the process of encoding extra information in digital data, such as video, images or sounds, by making small modifications to the data. Hiding information in sounds or images may be used to supplement an image or sound with additional information, or verify the integrity of the image or sound. The hidden information itself may be text, audio or image data or hyperlinks. For example, text captions may be used to label faces and buildings in an image. A short audio clip may associate a train whistle with an image of a locomotive. A hyperlink may join an image region to another document or data source.

The embedded data typically remains with the image when it is stored or transmitted. The embedded data may be meant to be extracted by an end user, or hidden to the end user. In the former instance, for example, a consumer may extract the embedded data and use it to satisfy an information need. In the latter instance, the embedded data may be a watermark. Watermarking is a technique used to label digital media by hiding copyright or other information into the underlying data. Unlike encryption, for example, which is used to restrict access to data, watermarking is employed to provide solid proof of authorship. Like data hiding generally, the watermark remains with the media. However, unlike data hiding generally, with watermarking the user cannot access the embedded information (i.e., the watermark).

Data hiding in general, and watermarking in particular, typically must satisfy the following requirements to be useful: they must be inaudible, and they must be robust. Although other criteria may be important (such as statistical inaudibility, the support for multiple data embeddings and self-clocking), the inaudibility and the robustness of the resulting data are most important. The first requirement is that the hidden data remain inaudible in the case where the host data is sound data. Otherwise, the quality of the sound may degrade.

The second requirement, robustness, relates to the survivability of the hidden data in light of the manipulation of the media in which it is embedded. Typically, sound data are subject to signal processing operations such as filtering, resampling, compression, noise, cropping, audio-to-digital and subsequent digital-to-audio conversion, etc. Because the host data will invariably be subject to such manipulation, the embedded data must be robust. That is, the embedded data must able to survive after the host data has been subjected to signal processing operations.

Several data hiding techniques are found in the prior art. Some hiding schemes employ spread spectrum techniques. This is typically applied to audio signals. In direct sequence spread spectrum coding, the signature is modulated by both a PN-sequence and the audio signal using bi-phase shift keying. It is then added to the original signal as an additive random noise. However, these schemes fail to meet optimally at least one of the above-identified requirements.

Thus, there is a need for a data hiding and watermarking technique that is inaudible in the case of audio data and has the maximum robustness to ensure that the embedded data survives both legitimate and illegitimate data manipulation.

SUMMARY OF THE INVENTION

One aspect of the invention is a method of embedding data into an audio signal. The method provides a data sequence for embedding in the audio signal, and computes masking thresholds for the audio signal from a frequency domain transform of the audio signal. The masking thresholds correspond to subbands of the audio signal, which are obtained from a masking model used to compress the audio signal. The method applies the masking threshold to the data sequence to produce masked data sequence and inserts the masked data sequence in the audio signal to produce an embedded audio signal.

Another aspect of the invention is a method of detecting data embedded in an audio signal. This method receives an audio signal in which data has been embedded using a masking threshold, analyzes the audio signal to estimate the masking threshold used in embedding the data, and applies the estimated masking threshold to the audio signal to extract the embedded data.

This document describes methods for the hiding of data, including watermarks, in human-perceptible sounds, that is, audio host data. These methods employ perceptual masking models to determine the optimal locations within host data to insert the hidden data or watermark. In one embodiment, a method comprises three steps. In the first step, data to be embedded is inputted. In the case of a watermark, this data is a unique signature, and may be a pseudo-noise (PN) code. In the case of hidden data to be embedded in the host data, this data is the hidden data itself, or the hidden data as spread against the frequency spectrum by a pseudo-noise (PN) code.

In the second step, the inputted data is embedded within the host data, in accordance with a perceptual mask of the host data. The perceptual mask determines the optimal locations within the host data to insert the inputted data. In the case of sounds, these optimal locations are determined by reference to the human auditory system. Alternative models mimicking the human auditory system can be used.

Finally, in the third step, the host data, with the embedded data, is further masked by a non-frequency mask, to ensure that the embedded data is indeed inaudible within the host data. In the case of audio data, the non-frequency mask is a temporal mask. Still other and further aspects, advantages and embodiments will become apparent in the following description and by reference to the accompanying drawings.

DETAILED DESCRIPTION OF THE DRAWINGS

General Overview

Figure 1:
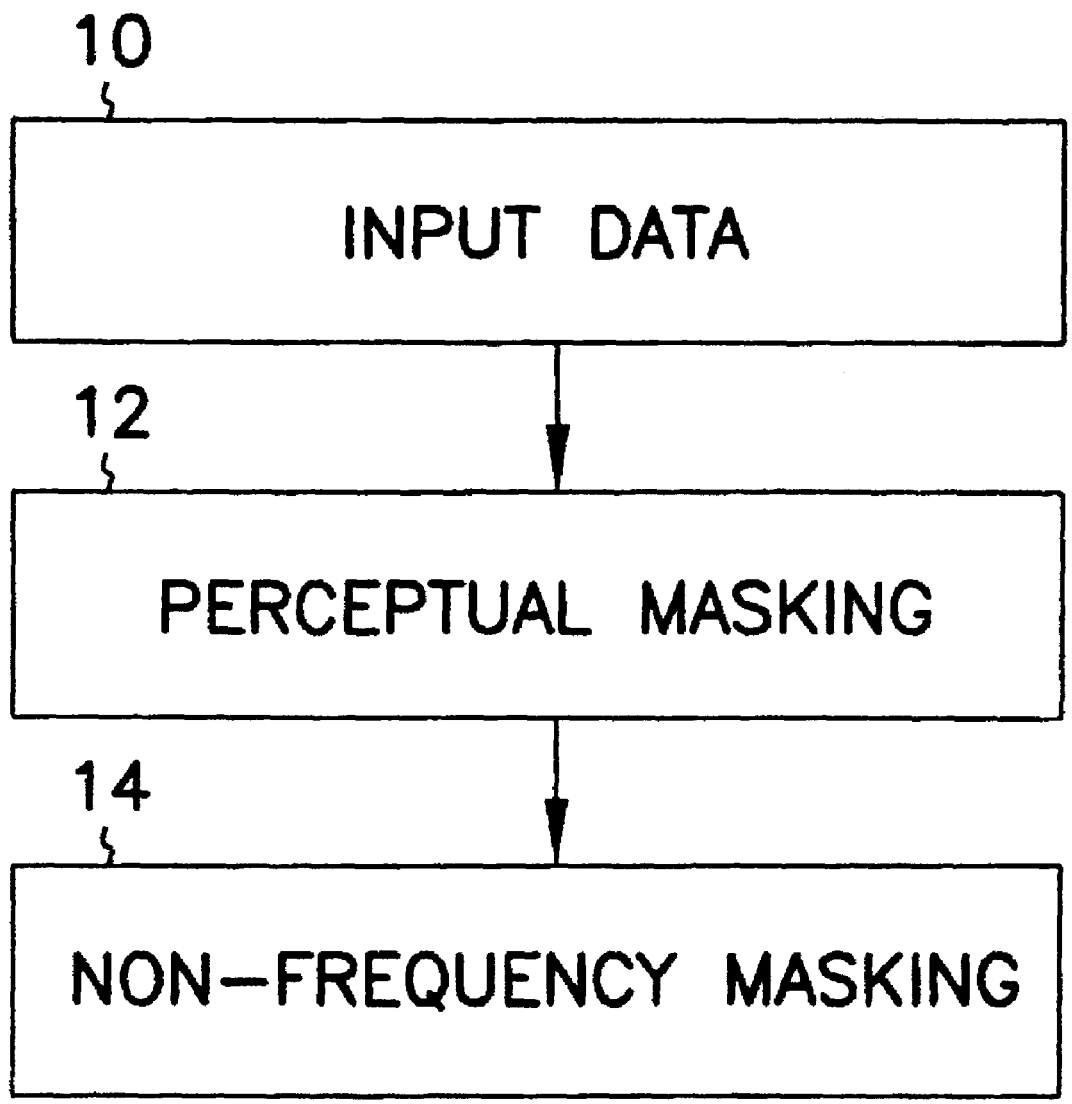
FIG. 1 is a flow chart of a method of performing perceptual masking for digital watermarking.

Embodiments of the invention provide for the hiding of data, including watermarks, in human perceptible sounds. That is, they provide for the hiding of data within host data, or watermarking host data. The host data is audio data. Referring to FIG. 1, a method according to one embodiment is shown. In step 10, data is inputted. In the case of watermarking, this data is a signature, or watermark, that acts as a unique identifier for the host data, and which may be generated by the watermarking method. In the case of embedding hidden data within the host data, this data is either the hidden data itself, or the hidden data as spread against a signature according to spread-spectrum techniques that are well known in the art. Spreading the signal provides for robustness of data. Without spreading the signal, the embedded hidden data amasses towards the low end of the frequency spectrum; a filter applied to the entire data set that removes low frequencies may also remove the embedded hidden data. Spreading the signal spreads the data over the entire frequency range. Note that in the case of watermarking the host data, the signature inherently is spread across the frequency spectrum without explicit spread-spectrum processing.

In one embodiment, the signature is a pseudo-noise (PN) sequence. These are used as codewords for the watermarks because of their noise-like characteristics, resistance to interference, and their good auto-correlation properties. PN-sequences are periodic noise-like binary sequences generated by length m linear shift registers. The maximum period of a PN-sequence is $2^m-1$. When the period is exactly $2^m-1$, the PN-sequence is called an m-sequence. In one embodiment, m-sequences are used to provide an easy way to generate a unique code for an author's identification. Furthermore, the period N autocorrelation function has peaks equal to 1 at 0, N, 2N, etc., and is approximately equal to 1/N, elsewhere. Because of these periodic peaks, an m-sequence is self-clocking. This allows synchronization with the embedded watermark during the detection process. It is also important if the signal is cropped and re-sampled.

In step 12, the data inputted in step 10 is embedded within the host data as dictated by a perceptual mask. A perceptual masking model is used to determine the optimal locations within the host data in which to insert the hidden data or watermark. The perceptual mask is specific to the host data being audio data. The mask provides for the data inputted by step 10 to be embedded with the host data, at places typically imperceptible to the human ear. That is, the perceptual mask exploits masking properties of the human auditory system. The perceptual masking of step 12 is conducted in the frequency domain.

Perceptual auditory masking is the effect by which a faint but audible sound becomes inaudible in the presence of another louder audible sound that acts as a masker. If two signals which occur simultaneously are close together in frequency, the stronger masking signal will make the weaker masked signal inaudible. The masking threshold of a master signal depends on the frequency, sound pressure level (SPL), and tone-like or noise-like characteristics of both the masker signal and the masked signal. For example, it is easier for a broadband noise to mask a tonal, than for a tonal signal to mask out a broadband noise. Moreover, higher frequencies are more easily masked.

Audio signals consist of telephone quality speech, wideband speech, and wideband audio. The frequency range for these types of audio signals are 300-3400 Hz for telephone speech signals, 50-7000 Hz for wideband speech range, and 20-20000 Hz for high quality wideband audio. The human ear acts as a frequency analyzer and can detect sounds with frequencies which vary from 10 Hz to 20000 Hz. The human auditory system can be modeled by a set of 26 bandpass filters with bandwidths that increase with increasing frequency. The 26 bands are known as the critical bands. The critical bands are defined around a center frequency in which the noise bandwidth is increased until there is just a noticeable difference in the tone at the center frequency. Thus, if a faint tone lies in the critical band of a louder tone, the faint tone will not be perceptible.

Frequency masking models have already been defined for the perceptual coding of audio signals. In one embodiment, the masking model used is MPEG Audio Psychoacoustic Model 1, as is disclosed in "Information Technology—Coding of moving pictures and associated audio for digital storage media at up to about 1.5 Mbit/s" tech. rep. ISO/IEC 11172 (1993). The psychoacoustic model presented in the report provides a masking model for layers 1-3 in the MPEG standard. The calculation of the psychoacoustic model has to be adapted to the corresponding MPEG layer. In general, the input audio stream is filtered into multiple subbands. The model calculates a signal to mask ratio for each subband using the following steps:

1) Calculation of the FFT for time to frequency conversion.
2) Determination of the sound pressure level in each subband.
3) Determination of the threshold in quiet (absolute threshold).
4) Finding of the tonal (more sinusoid-like) and non-tonal (more noise-like) components of the audio signal.
5) Decimation of the maskers, to obtain only the relevant maskers.
6) Calculation of the individual masking thresholds.
7) Determination of the global masking threshold.
8) Determination of the minimum masking threshold in each subband.

9) Calculation of the signal-to-mask ratio in each subband.

The steps above are further described in section D.1 in Annex D of the technical report.

The report also defines a Psychoacoustic Model 2. Psychoacoustic Model 2 is an independent psychoacoustic model that can be adjusted and adapted to any ISO/IEC 11172-3 layer.

There are three inputs used in Psychoacoustic model 2. They area:

a) The shift length for the threshold calculation process, iblen, where 384<iblen,640. This iblen must remain constant over any particular application of the threshold calculation process.

b) The newest iblen samples of the signal, with the samples delayed (either in the filter bank or psychoacoustic calculation) such that the window of the psychoacoustic calculation is centered in the time-window of application.

c) The sampling rate. There are sets of tables provided for the standard sampling rates. Sampling rate, like iblen must necessarily remain constant over one implementation of the threshold calculation process.

There is one output from Psychoacoustic Model 2, a set of Signal-to-Masking Ratios, $SMR_n$. The steps in calculating the $SMR_n$ are listed below. As those of skill in the art will appreciate, each step typically uses a result from the previous step to determine a result. The steps are:

a) Reconstruct 1024 samples of the input signal, using concatenations of the iblen input samples.

b) Calculate the complex spectrum of the input signal by constructing a 1024 point Hann window, performing a FFT on the window and by calculating a polar transformation of the window. The polar transformation has a magnitude and phase component.

c) Calculate a predicted magnitude and phase components using previous block data.

d) Calculate an unpredictability measure.

e) Calculate the energy and unpredictability in the threshold calculation partitions.

f) Convolve the partitioned energy and unpredictability with a spreading function.

g) Calculate a tonality index using the normalized results from step 6.

h) Calculate the Signal to Noise Ratio in each partition.

i) Calculate the power ratio.

j) Calculate the actual energy threshold.

k) Spread the threshold energy of FFT lines l) Calculate a final energy threshold of audibility.

m) Perform pre-echo control if using MPEG Layer III n) Calculate the Signal to Mask (SMR) ratios.

Further details regarding each of the steps described above can be found in section D.2 of Annex D of the technical report.

In step 14, the host data, including the embedded hidden data or watermark, is further subject to a non-frequency mask. Because the perceptual mask in step 12 is a frequency domain mask, a further mask is necessary to ensure that the embedded data remains inaudible in auditory host data. In the case of auditory host data, the non-frequency mask is a temporal mask.

With respect to auditory data, temporal masking refers to both pre- and post-masking. Pre-masking effects render weaker signals inaudible before the stronger mask is turned on, and post-masking effects render weaker signals inaudible after the stronger masker is turned off. Pre-masking occurs from 5-20 msec before the masker is turned on while post-masking occurs from 50-200 msec after the masker is turned off. Such temporal masking is necessary because the perceptual frequency masking does not provide good time localization. In particular, pre-echoes (audible distortion) will be created. In one embodiment, the embedded data is weighted in the time domain with the relative energy of the signal. The time domain weighting operation attenuates the energy of the computed embedded data. Those skilled in the art, however, will appreciate that any other type of temporal masking can also be used. Temporal masking models are well known in the art.

As have been described, steps 10, 12 and 14 of FIG. 1 provide a general overview. Because, however, the implementation varies particularly as to whether hidden data is being embedded into the host data, or whether a watermark is being embedded into the host data, the specifics of the implementation as to watermarking and hidden data embedding are now provided.

Hardware Implementation

Figure 2:
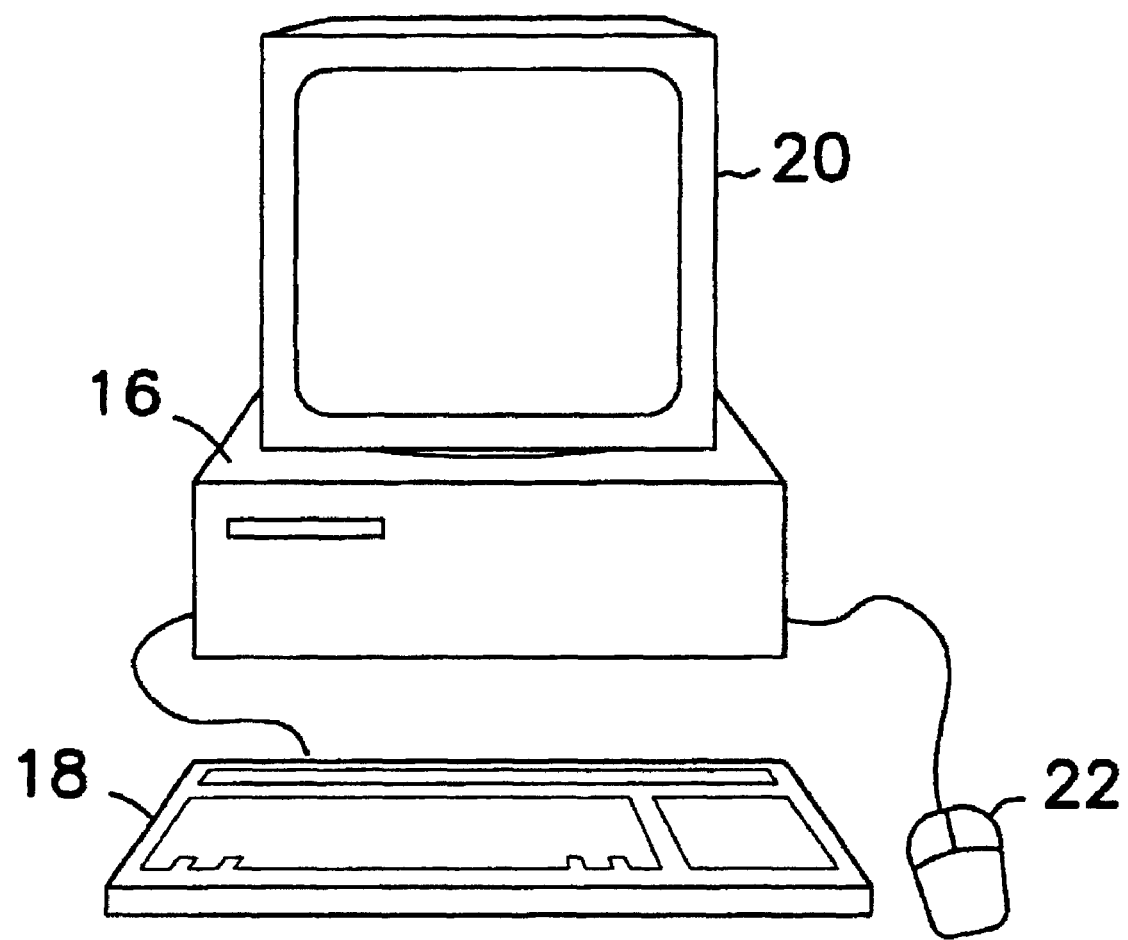
FIG. 2 is a diagram of a typical computer to be used with the invention.

The invention is not limited as to the type of computer on which it runs. However, a typical example of such a computer is shown in FIG. 2. Computer 16 is a desktop computer, and may be of any type, including a PC-compatible computer, an Apple Macintosh computer, a UNIX-compatible computer, etc. Computer 16 usually includes keyboard 18, display device 20 and pointing device 22. Display device 20 can be any of a number of different devices, including a cathode-ray tube (CRT), etc. Pointing device 22 as shown in FIG. 2 is a mouse, but the invention is not so limited. Not shown is that computer 16 typically also comprises a random-access memory (RAM), a read-only memory (ROM), a central-processing unit (CPU), a fixed storage device such as a hard disk drive, and a removable storage device such as a floppy disk drive. The computer program to implement the invention is typically written in a language such as C, although the invention is not so limited.

Data Hiding within an Audio Host Data

Figure 3:
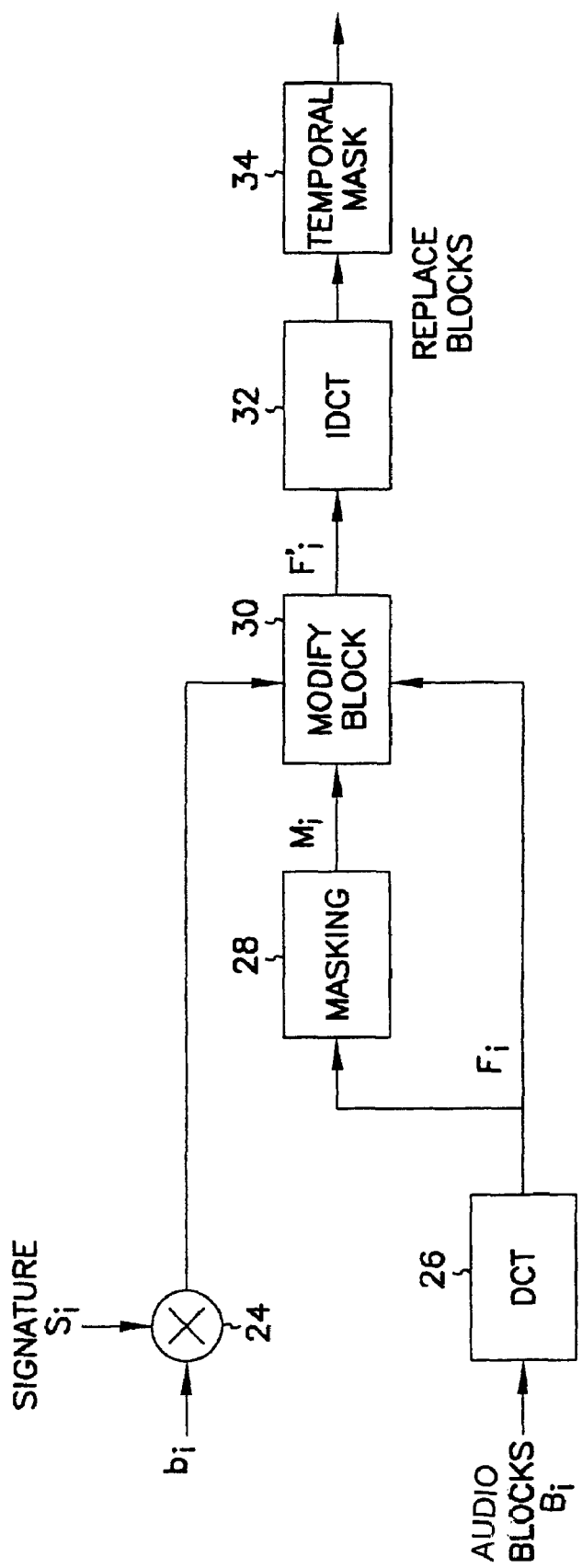
FIG. 3 is a flow chart of a method effectuating data hiding within a sound using perceptual frequency masking and temporal masking.

The embodiment shown in FIG. 3 illustrates the data hiding as it relates to host data that is an audio signal. Referring now to FIG. 3, a block diagram of one embodiment, in which hidden data is embedded into a sound by using a perceptual mask, is shown. As shown in the diagram, blocks B.sub.i of the sound data (host data) are selected to embed the data b.sub.i which are first spread by signature S.sub.i. The set of all data b is hidden one bit at a time in particular block B of the sound data. The notation b.sub.i refers to the I bit of hidden data b, while the notation B.sub.i refers to the I block of host data B. Similarly, the notation S.sub.i refers to the I bit of signature S.

In step 24, data b.sub.i is spread by signature S.sub.i. Data b.sub.i can be any type of data: caption information regarding the audio; sound data regarding the audio; etc. Signature S.sub.i can by any type of signature—for example, a pseudo-noise (PN) code as has been already described. Note that step 24 is not required. Data b does not have to be spread in order for this method to function correctly; without spreading against a signature S, those skilled in the art will understand that there is then an implicit "spreading" against a signature S having all 1 bits. However, spreading of the data B is preferable for robustness. In step 26, a discrete cosine transform (DCT) is applied to each block B.sub.i to form a DCT block F.sub.i. That is, F.sub.i is the frequency domain equivalent of block B.sub.i. Transforming the host data into the frequency domain is necessary in order to properly apply the perceptual mask in this embodiment.

In step 28, the perceptual mask is applied to each block F.sub.i to generate a masked block M.sub.i corresponding to F.sub.i. The perceptual mask takes into account the human auditory system so that the hidden data is embedded within the host data in a manner that makes the hidden data inaudible within the host data. The invention is not limited to any particular perceptual mask; however, as has already been described in conjunction with the general overview, one particular perceptual mask for auditory data has been used. Therefore, reference to the discussion provided earlier should be made in order for further understanding thereto.

In step 30, a bit $b_i$ is hidden in block $F_i$ by modifying the DCT coefficients according the equation $$F_i(j,k) = ([F_i(j,k)/M_i(j,k)] + (1/4) b_i S_i(j,k)) M_i(j,k),$$

where [●] denotes the rounding operation. In step 32, the original blocks $B_i$ are replaced by the inverse DCT's of the modified blocks $F_i'$. Finally, in step 34, temporal masking is applied to the data. This method is not limited to any particular temporal mask. One particular temporal mask for host data that is a sound has already been described in conjunction with the general overview, and reference should be made to that discussion for further understanding thereto. Temporal masking ensures that the embedded data is indeed hidden (i.e., inaudible) within the host data as examined by the human ear.

As has been described, the method shown in FIG. 3 provides for data embedding within sound according to a perceptual auditory mask and a temporal mask. The method of FIG. 3 also provides for robust data embedding. Spreading the hidden data in step 24 ensures that a filter cutting off the low frequencies of the data will not corrupt the data. Furthermore, the method provides for inaudible data embedding, in that the mask of step 28 is perceptual such that the data is then embedded in step 30 in places within the sound which are imperceptible to the human ear. The temporal mask in step 34 complements the perceptual mask, and further ensures that the embedded hidden data is inaudible.

Those skilled in the art will recognize that the method shown in FIG. 3 is largely reversible such that extraction of the embedded data from sounds having embedded data is possible. Given a sound with (possibly modified) embedded hidden data blocks $F_i''$, the data bit $b_i$ may be recovered by forming the difference $$\hat{b}_i = \sum_{j,k} M_i'(j,k) \mathrm{sgn}\left( \frac{F_i''(j,k)}{M_i'(j,k)} - \left[ \frac{F_i''(j,k)}{M_i'(j,k)} \right] \right)$$

where $M_i'$ is the frequency mask estimated by the receiver times the signature $S_i$, i.e., $M_i' = M_i^{est} * S_i$, and $\mathrm{sgn}(●)$ is the sign value. The bit decision for block $B_i$ is weighted by the mask $M_i'$. The bit error rate (BER) of this scheme is zero when no distortion is present in the received sound. A simple expression for the upper bound of the BER when zero mean Gaussian noise with variance $\sigma^2$ is added to the signal can be derived. Without loss of generality, assume that $b_i = 1$. A decision error occurs for coefficient $F''(j,k)$ whenever the magnitude of a noise sample $|w(j,k)|$ falls in one of the intervals $$\left[ \frac{(4n+1)M(j,k)}{4}, \frac{(4n+3)M(j,k)}{4} \right] = I_n$$

for $n = 0, 1, 2, \ldots$. Using the complementary error function erfc(·), the probability of error for coefficient $F''(j,k)$ may be written as $$P_e(F''(j,k), \sigma) = 2 \sum_{n=0}^{\infty} \mathrm{erfc}\left( \frac{I_n}{\sigma} \right).$$

For $\sigma$ fixed, $P_e(F''(j,k), \sigma)$ decreases as $M(j,k)$ increases. Therefore, the receiver places more weight on coefficients with large masking values. The overall probability of error for bit $b_i$ is a weighted combination of the $P_e(F''(j,k), \sigma)$ in block $B_i$.

Watermark Generation for Sound Host Data

Figure 4A:
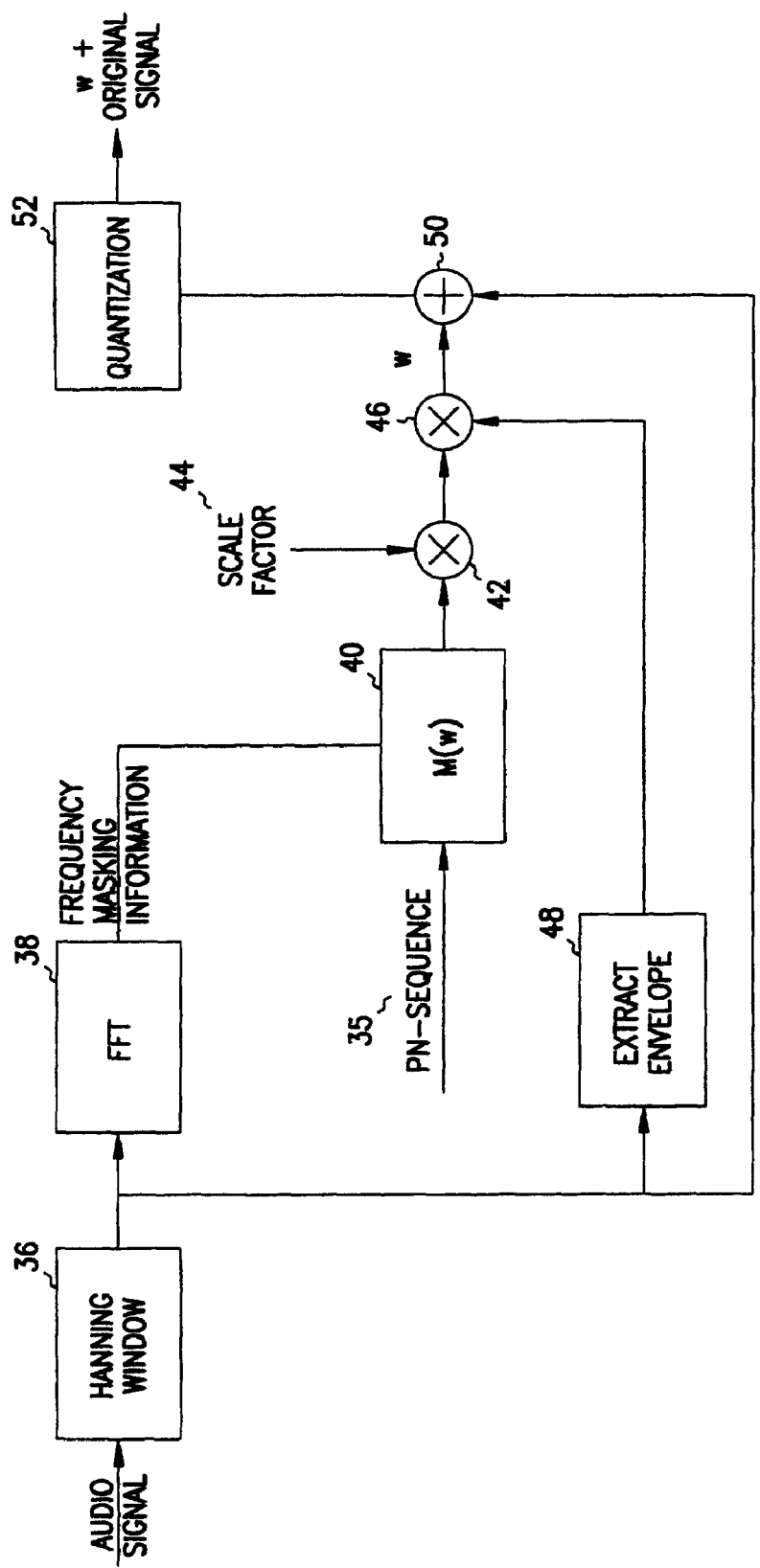
FIG. 4(a) is a block diagram of one embodiment in which a watermark for audio sound host data is generated; and, FIG. 4(b) is a block diagram of a method effectuating watermark generation for audio data.
Figure 4B:
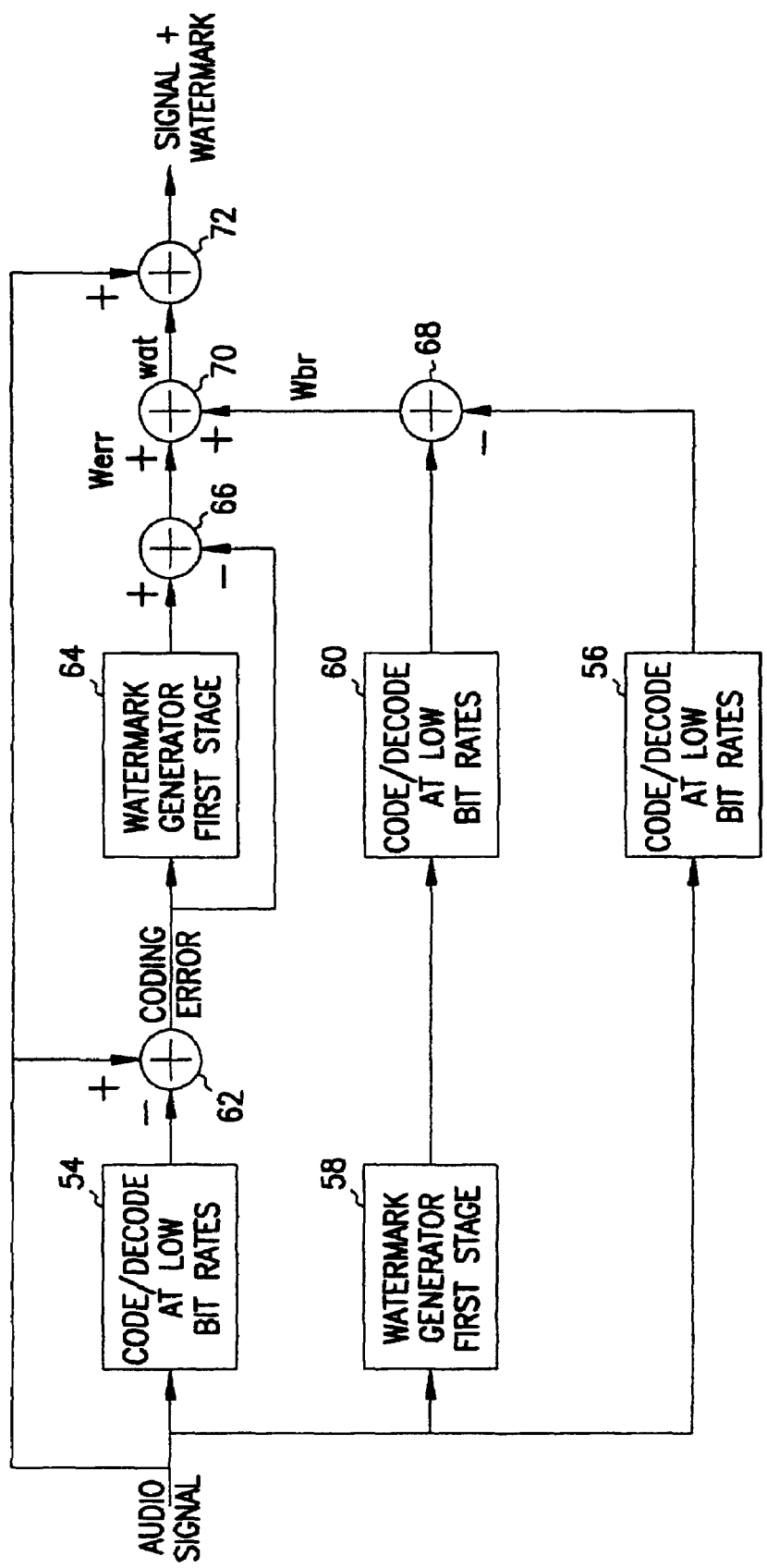

The embodiment shown in FIG. 4 illustrate the watermark generation as it relates to host data that is a sound. Referring now to FIG. 4(*a*), a block diagram of one embodiment, in which a watermark for audio sound host data is generated, is shown. The basic watermarking process starts with a PN-sequence 35. Maximum 35. Maximum length PN-sequences are used because they provide an easy way to generate a unique code for an author's identification. Like random binary sequences, PN sequences have 0's and 1's that occur with equal probabilities. The autocorrelation function (ACF) of such a PN-sequence has period N and is binary valued. Because of the periodicity of the ACF, the PN sequence is self-clocking. This allows the author of the host data to synchronize with the embedded watermark during the detection process. This is important if the signal is cropped and resampled.

To actually generate the watermark, a masking threshold of the signal is first calculated using the MPEG Audio Psychoacoustic Model 1, as previously described. In step 36, the audio data is segmented into blocks, specifically audio segments of 512 samples each. Each audio segment (block) is weighted with a Hanning window. Consecutive blocks overlap by fifty percent. In step 38, a fast Fourier transform (FFT) is used to convert the segments to the frequency domain, and in step 40, the masking threshold is approximated with a 10th order all-pole filter, M(w), using a least squares criterion, which is part of the MPEG Audio Psychoacoustic Model 1. Note that this is the perceptual masking of the watermark, as represented by PN-sequence 35, in the frequency domain. Thus, the PN-sequence is filtered with the approximate masking filter, M(w), in order to ensure that the spectrum of the watermark is below the masking threshold (i.e., so that it cannot be heard or perceived by the human ear).

Since the spectral content of the audio signal changes with time, watermarks added to different blocks will be in general different even if they are generated from the same starting PN-sequence. However, it is preferable to use different PN-sequences for different blocks to make the statistical detection by an unauthorized user of the watermark more difficult. Note also that using long PN-sequences or embedding long cryptographic digital signatures also helps in this respect.

Frequency domain shaping is not enough, in some cases, to guarantee that the watermark will be inaudible. Frequency domain masking computations are based on Fourier analysis. A fixed length FFT does not provide good time localization. In particular, a watermark computed using frequency domain masking will spread in time over the entire analysis block. If the signal energy is concentrated in a time interval that is shorter than the analysis block length, the watermark is not masked outside of that subinterval. This then leads to audible distortion, e.g., pre-echoes. To address this problem, the watermark is weighted in the time domain with the relative energy of the signal.

Thus, in step 42, the resulting masked watermark is scaled by scale factor 44, and then in step 46 is scaled by the audio signal as each segment thereof has been weighted with a Hanning window in step 36 and as has then been extracted by an extract envelope in step 48. The resulting scaled masked watermark is in step 50 added to the audio signal as each segment thereof has been weighted with a Hanning window in step 36. In step 52, the resulting signal undergoes quantization.

The time domain weighting operating attenuates the energy of the computed watermark. In particular, watermarks obtained as has been described have amplitudes that are typically smaller than the quantization step size. Therefore, the watermark would be lost during the quantization process. Note that detection performance is directly proportional to the energy of the watermark. It has been found that it is possible to prevent watermark loss during quantization in step 52 and improve detection performance by amplifying the watermark by 40 dB before weighting it in the domain with the relative energy of the signal. It has been found experimentally that this amplification does not affect the audibility of the watermark because of the attenuation effect of the time domain weighting operating.

Referring now to FIG. 4(*b*), a block diagram of a method effectuating watermark generation for audio data is shown. It has been found that because most of the energy of an audio watermark lies in low frequencies, an optimal way to detect the low frequency watermarking information is to generate a low-frequency watermark as the difference between a low bit rate coded/decoded watermarked signal and the coded/decoded original signal at the same bit rate. Watermarking itself is accomplished using the watermarking scheme described in conjunction with FIG. 4(*a*). The low bit rate chosen to implement this operation is the minimal bit rate for which near-transparent audio coding is known to be possible for signals sampled at the rate of the original signal. This scheme is more effective than other schemes that may attempt to add the watermark on a lowpass filtered version of the signal because the coding/decoding operation is not a linear operation and does not permute with the watermarking operation.

Thus, in steps 54 and 56, the audio signal undergoes coding and decoding at low bit rates. In step 58, a watermark is generated as has been described in conjunction with FIG. 4(*a*), which is then also coded and decoded in step 60. In step 62, the audio signal is, the coded and decoded audio signal is subtracted from the audio signal itself, a watermark for the resulting difference (error) then being generated in step 64 as has been described in conjunction with FIG. 4(*a*). The resulting difference is then subtracted from the watermark in step 66. Similarly, in step 68 the watermark generated in step 58 and coded and decoded in step 60 has subtracted from it the audio signal as coded and decoded in step 56. The signals resulting from steps 66 and 68 are added together in step 70, to which the audio signal itself is added in step 72 to generate the audio signal including a watermark.

Note that the signal output from step 68 is shown as wbr in FIG. 4(*b*), where notation br refers to the bit rate of the coder/decoder. Furthermore, for optimal watermark detection performance at higher bit rates, watermarking information is needed to be added in the higher frequency bands. This is done by producing the watermark werr for the coding error, which is the signal resulting from step 66. The coding error is the difference between the original audio signal and its low bit rate coded version. The watermark werr is computed using the watermarking scheme described in conjunction with FIG. 4(*a*). The final watermark output in step 70 is thus the sum of the low-frequency watermark and the coding error watermark.

As has been described, the methods shown in FIG. 4(*a*) and FIG. 4(*b*) provide for watermarking a sound according to a perceptual mask (frequency domain) and a temporal mask (i.e., time-domain weighting). The watermark embedded within the sound host data according to these methods should be extractable even if common signal processing operations are applied to the host data. This is particularly true in the case of deliberate unauthorized attempts to remove the watermark. For example, a pirate may attempt to add noise, filter, code, re-scale, etc., an image in an attempt to destroy the watermark. The embedded watermark, however, is noise-like and its location over multiple blocks of the data is unknown. Therefore, the pirate has insufficient knowledge to directly remove the watermark. Furthermore, a different signature is preferably used for each block to further reduce unauthorized watermark removal by cross-correlation. Therefore, any destruction attempts are done blindly.

In some cases, the author of the data has access of the original signal S (that is, the original host data), and the signature to detect whether a watermark is within a host sound data. Detection of the watermark is accomplished via hypothesis testing:

H0: X=R−S=N (no watermark)
H1: X=R−S=W'+N (watermark)

where R is the potentially pirated signal, W' is the potentially modified watermark, and N is noise. The correct hypothesis is obtained by applying a correlating detector on X with W and comparing with a threshold. In some cases, a generalized likelihood ratio test must be applied.

Although specific embodiments have been illustrated and described herein, it will be appreciated by those of ordinary skill in the art that any arrangement which is calculated to achieve the same purpose may be substituted for the specific embodiments shown. This application is intended to cover any adaptations or variations of the present invention. Therefore, it is manifestly intended that this invention be limited only by the following claims and equivalents thereof.

The invention claimed is:

1. A method of embedding data into an electronic audio signal, the method comprising:
   providing a data sequence for embedding in the audio signal;
   computing masking thresholds for the audio signal from a frequency domain transform of the audio signal, the masking thresholds corresponding to subbands of the audio signal, wherein the masking thresholds are obtained from a masking model used to compress the electronic audio signal;
   applying the masking threshold to the data sequence to produce masked data sequence; and
   inserting the masked data sequence in the electronic audio signal to produce an embedded audio signal.

2. The method of claim 1 including quantizing the embedded audio signal.

3. The method of claim 1 including: applying a time domain mask to the data sequence to produce the masked data sequence.

4. The method of claim 1 wherein the data sequence comprises a pseudorandom sequence used to convey an identifier.

5. A method of detecting data embedded in an electronic audio signal, the method comprising:
   receiving an electronic audio signal in which data has been embedded using a masking threshold;
   analyzing the electronic audio signal to estimate the masking threshold used in embedding the data; and
   applying the estimated masking threshold to the electronic audio signal to extract the embedded data, wherein the applying includes placing more weight on portions of the electronic audio signal corresponding to larger masking coefficient values than on portions of the electronic audio signal corresponding to smaller masking coefficient values.

6. The method of claim 5 wherein analyzing the electronic audio signal comprises analyzing the electronic audio signal to estimate the masking threshold used to compress the electronic audio signal.

7. The method of claim 5 wherein the data is conveyed using a pseudo random sequence.

8. The method of claim 7 wherein the pseudo random sequence is used to synchronize the detecting of the data through a correlation of the pseudo random sequence.

9. A non-transitory computer readable medium on which is stored instructions, which, when executed by a processor, perform a method of embedding data into an electronic audio signal, the method comprising:
   providing a data sequence for embedding in the audio signal;
   computing masking thresholds for the audio signal from a frequency domain transform of the audio signal, the masking thresholds corresponding to subbands of the audio signal, wherein the masking thresholds are obtained from a masking model used to compress the electronic audio signal;
   applying the masking threshold to the data sequence to produce masked data sequence; and
   inserting the masked data sequence in the electronic audio signal to produce an embedded audio signal.

10. A non-transitory computer readable medium on which is stored instructions, which, when executed by a processor, perform a method of detecting data embedded in an electronic audio signal, the method comprising:
   receiving an electronic audio signal in which data has been embedded using a masking threshold;
   analyzing the electronic audio signal to estimate the masking threshold used in embedding the data; and
   applying the estimated masking threshold to the electronic audio signal to extract the embedded data, wherein the applying includes placing more weight on portions of the electronic audio signal corresponding to larger masking coefficient values than on portions of the electronic audio signal corresponding to smaller masking coefficient values.

* * * * *